US009300382B2

(12) United States Patent
Aoki et al.

(10) Patent No.: US 9,300,382 B2
(45) Date of Patent: Mar. 29, 2016

(54) WIRELESS SIGNAL PROCESSOR AND WIRELESS APPARATUS

(75) Inventors: Tsuguhide Aoki, Kawasaki (JP); Yasuhiko Tanabe, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 664 days.

(21) Appl. No.: 13/495,733

(22) Filed: Jun. 13, 2012

(65) Prior Publication Data
US 2012/0252366 A1 Oct. 4, 2012

Related U.S. Application Data
(63) Continuation of application No. PCT/JP2009/006905, filed on Dec. 16, 2009.

(51) Int. Cl.
H04B 1/00 (2006.01)
H04B 1/38 (2015.01)
H04B 7/06 (2006.01)
H04B 17/12 (2015.01)

(52) U.S. Cl.
CPC ............. H04B 7/0617 (2013.01); H04B 17/12 (2015.01)

(58) Field of Classification Search
CPC .......................... H04B 17/0007; H04B 7/0617
USPC .................... 455/63.1, 63.4, 24, 73
See application file for complete search history.

(56) References Cited

U.S. PATENT DOCUMENTS 7,392,015 B1 * 6/2008 Farlow et al. .............. 455/67.11
2005/0085268 A1 4/2005 Itoh
2006/0234694 A1 10/2006 Kawasaki et al.
2008/0310318 A1 * 12/2008 Bang et al. .................... 370/252
2010/0150013 A1 * 6/2010 Hara et al. .................... 370/252

FOREIGN PATENT DOCUMENTS

| JP | 2002-530998 A | 9/2002 |
| JP | 2003-163622 A | 6/2003 |
| JP | 2004-159200 A | 6/2004 |
| JP | 2006-279668 A | 10/2006 |
| JP | 2006-279902 A | 10/2006 |
| JP | 2009-206735 A | 9/2009 |
| WO | WO 00/31892 A1 | 6/2000 |

OTHER PUBLICATIONS

International Search Report (in English) dated Mar. 9, 2010 in counterpart International Application No. PCT/JP2009/006905.

* cited by examiner

Primary Examiner — Ping Hsieh
Assistant Examiner — Xin Jia
(74) Attorney, Agent, or Firm — Holtz, Holtz & Volek PC

(57) ABSTRACT

One embodiment provides a signal processor configured to cooperate with a first apparatus having first and second antennas and a second apparatus having third and fourth antennas, including: first and second calculators for calculating first and second coefficient, respectively; first and second estimators for estimating first and second transfer functions of a path between the first and second apparatuses based on first and second weights; and a third calculator for calculating a third coefficient. The third coefficient is used with the first and second transfer functions for making a transfer function ratio regarding the first antenna, a transfer function ratio regarding the second antenna, a transfer function ratio regarding the third antenna and a fourth transfer function ratio regarding the fourth antenna same as one another.

9 Claims, 9 Drawing Sheets

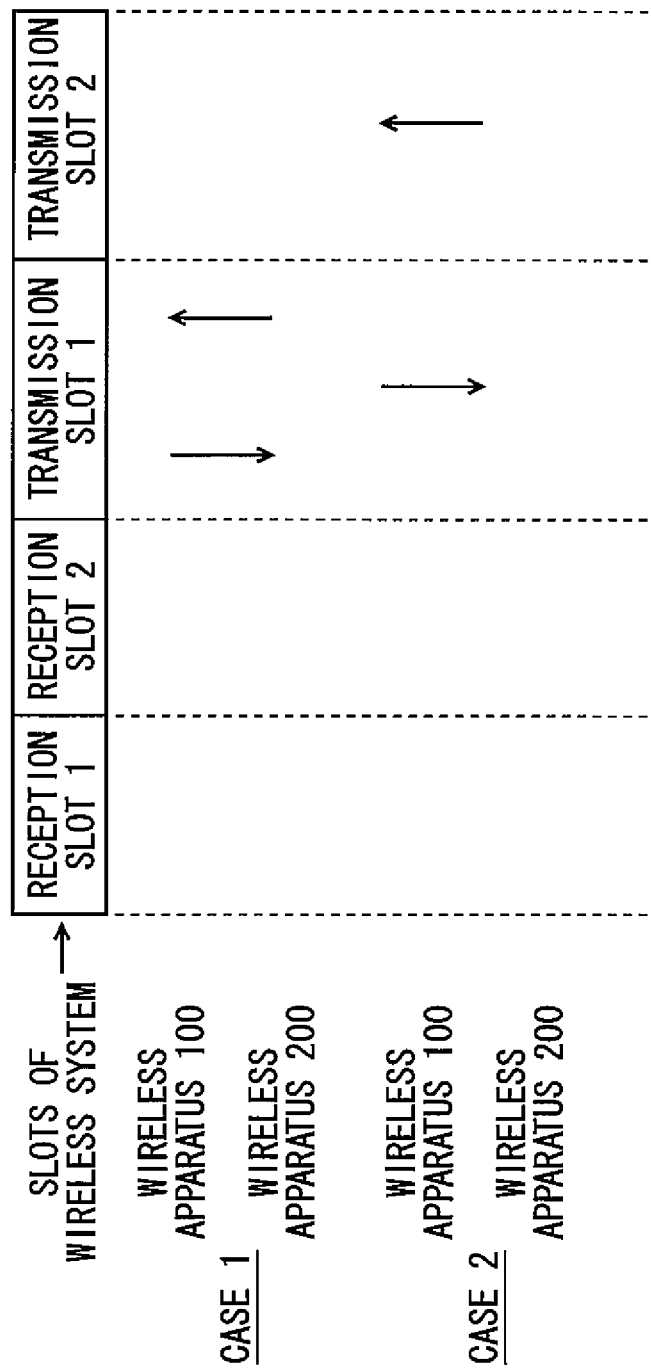

US 9,300,382 B2

WIRELESS SIGNAL PROCESSOR AND WIRELESS APPARATUS

CROSS-REFERENCE TO RELATED APPLICATION(S)

This is a Continuation application of PCT Application No. PCT/JP09/006905, filed on Dec. 16, 2009, which was published under PCT Article 21(2) in Japanese, the entire contents of which are incorporated herein by reference.

FIELD

Embodiments described herein relate generally to wireless communication.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIG. 9 illustrates slots of the wireless system according to the first embodiment.

DETAILED DESCRIPTION

In general, one embodiment provides a wireless signal processor configured to cooperate with a first wireless apparatus having a first antenna and a second antenna, and a second wireless apparatus having a third antenna and a fourth antenna, the wireless signal processor including: a first calculator configured to calculate a first calibration coefficient for making a first ratio of transfer functions of first reception and transmission systems for the first antenna and a second ratio of transfer functions of second reception and transmission systems for the second antenna same as each other; a second calculator configured to calculate a second calibration coefficient for making a third ratio of transfer functions of third reception and transmission systems for the third antenna and a fourth ratio of transfer functions of fourth reception and transmission systems for the fourth antenna same as each other; a first estimator configured to estimate a first transfer function of a path from the first wireless apparatus to the second wireless apparatus using a signal obtained by receiving, at a first reception weight by the second wireless apparatus, a first calibration signal transmitted from the first wireless apparatus using a first transmission weight determined using the first calibration coefficient; a second estimator configured to estimate a second transfer function of a path from the second wireless apparatus to the first wireless apparatus using a signal obtained by receiving, at a second reception weight by the first wireless apparatus, a second calibration signal transmitted from the second wireless apparatus using a second transmission weight determined using the second calibration coefficient; and a third calculator configured to calculate a third calibration coefficient for using the first transfer function and the second transfer function to make the first to fourth ratios same as one another.

Embodiments will be described.

First Embodiment

Figure 1:
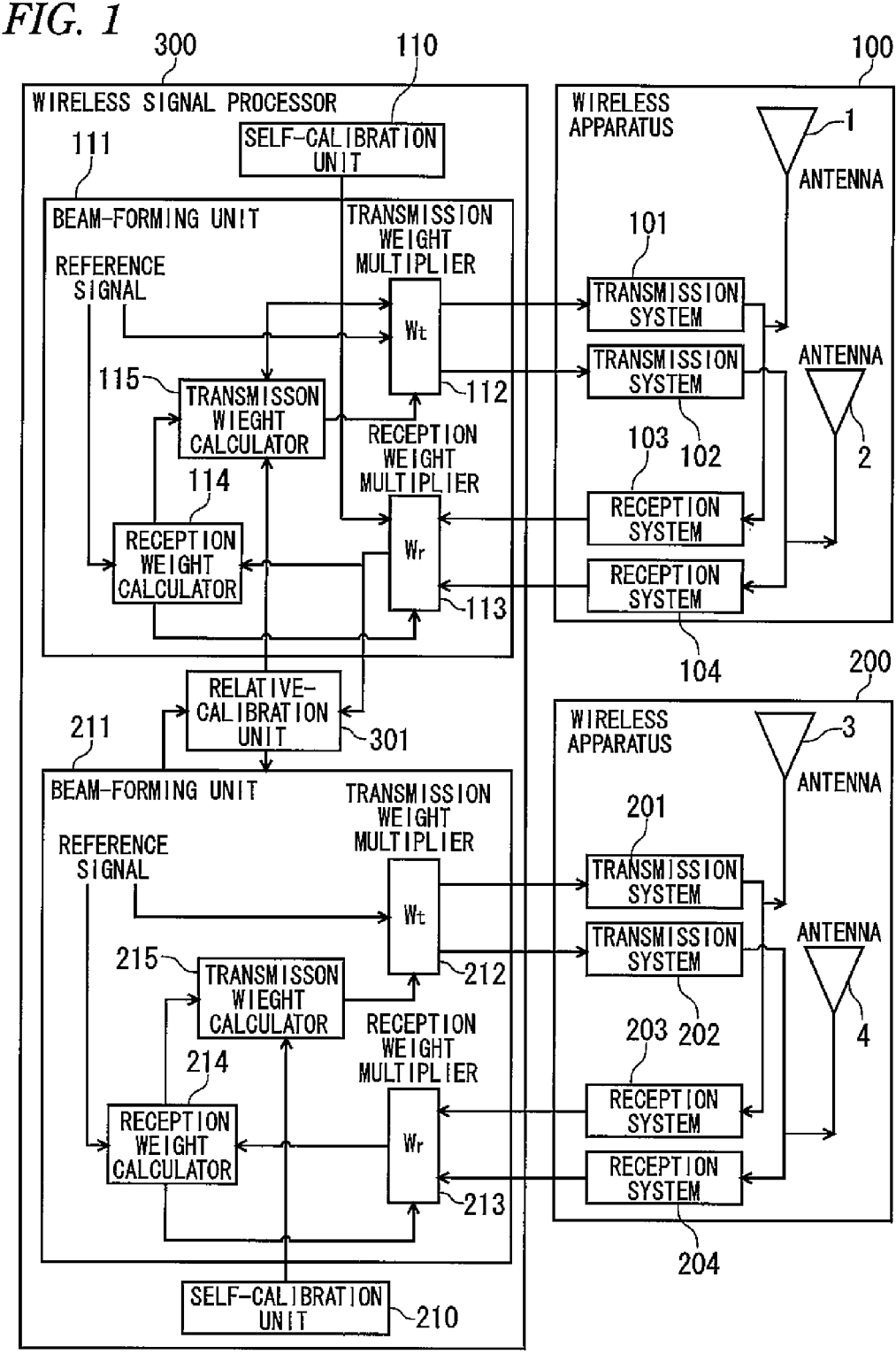
FIG. 1 illustrates a wireless system according to a first embodiment.

FIG. 1 illustrates a wireless system according to a first embodiment. The wireless system according to the first embodiment includes a wireless apparatus 100, a wireless apparatus 200 and a wireless signal processor 300, which are physically separated from one another. The number of wireless apparatuses connected to the wireless signal processor 300 is not limited to 2. A larger number of wireless apparatuses can be connected thereto. The wireless signal processor 300 can communicate with other user terminals (e.g., cellular phones) existing widely by being connected to many wireless apparatuses.

For example, in a cellular system or the like, plural physically-separated wireless apparatuses cooperate to form one electric wave (or beam) having directivity (hereinafter referred to as "performing cooperative communication"), in order to enhance the reception power of a wireless apparatus located at an edge of a cell, while reducing interference to another wireless apparatus.

The wireless signal processor 300 performs cooperative communication using the wireless apparatuses 100 and 200 which are physically separated from each other. The wireless signal processor 300 performs calibration on the wireless apparatuses 100 and 200. The wireless apparatuses 100 and 200 perform transmission and reception (e.g., frequency conversion and AD/DA conversion) of wireless signals.

The wireless signal processor 300 and the wireless apparatus 100 are connected to each other by a wired communication network (e.g., an optical fiber network). The wireless signal processor 300 and the wireless apparatus 200 are also connected to each other by a wired communication network. This wireless system can be a cellular system. The wireless signal processor 300 can be a base band unit (BBU). Each of the wireless apparatuses 100 and 200 can be a remote wireless unit (RRU).

The wireless apparatus 100 includes an antenna 1, an antenna 2, transmission systems 101 and 102, and reception systems 103 and 104. The transmission system 101 and the reception system 103 perform wireless signal transmission and wireless signal reception via the antenna 1, respectively. The transmission system 102 and the reception system 104 perform wireless signal transmission and wireless signal reception via the antenna 2, respectively.

The wireless apparatus 200 includes an antenna 3, an antenna 4, a transmission system 201, a transmission system 202, a reception system 203, and a reception system 204. The transmission system 201 and the reception system 203 perform wireless signal transmission and wireless signal reception via the antenna 3, respectively. The transmission system 202 and the reception system 204 perform wireless signal transmission and wireless signal reception via the antenna 4, respectively.

The transmission systems 101, 102, 201, and 202 each have a digital-to-analog converter (not shown) and an up converter (not shown). The reception systems 103, 104, 203, and 204 each have an analog-to-digital converter (not shown) and a down converter (not shown). The transmission systems 101, 102, 201, and 202, and the reception systems 103, 104, 203, and 204 each have a noise removal filter (not shown).

The wireless signal processor 300 includes self-calibration units 110 and 210, beam-forming units 111 and 211, a relative-calibration unit 301. The self-calibration unit 110 performs the calibration of the transmission and reception systems for the antennas 1 and 2 of the wireless apparatus 100. The self-calibration unit 210 performs the calibration of the transmission and reception systems for the antennas 3 and 4 of the wireless apparatus 200. The relative-calibration unit 301 performs the calibration of the transmission and reception systems for the antenna 1 (or 2) of the wireless apparatus 100 and the transmission and reception systems for the antenna 3 (or 4) of the wireless apparatus 200.

The beam-forming unit 111 performs a weighted combination of signals received by the wireless apparatus 100. The beam-forming unit 111 forms electric waves (or beams), which are transmitted from the wireless apparatus 100 and have directivity toward a user terminal. The beam-forming unit 111 includes a transmission weight multiplier 112, a reception weight multiplier 113, a reception weight calculator 114, and a transmission weight calculator 115. The reception weight calculator 114 calculates weights (reception weights) for performing, when the wireless apparatus 100 receiving wireless signals from the antennas 1 and 2, weighted combination thereon. The reception weight calculator 114 can calculate the reception weight such that the reception characteristic (such as the signal strength of the received signal combined with the reception weight, SNR, or SINR) of a wireless signal is substantially maximized. Alternatively, one of plural weights, which maximizes the reception characteristic of the wireless signal, can be selected. The reception weight multiplier 113 multiplies the signal received at the wireless apparatus 100 by the reception weight calculated at the reception weight calculator 114. The transmission weight calculator 115 calculates weights (transmission weights) for forming beams when the wireless apparatus 100 transmits wireless signals. The transmission weight can be calculated by multiplying a reception weight corresponding to a signal received from a user terminal, toward which a directional beam is directed, by a self-calibration result. Alternatively, the transmission weight can be calculated by multiplying a reception weight corresponding to a signal received from a user terminal by a self-calibration result and the relative-calibration result. The transmission weight multiplier 112 multiplies a transmission weight calculated at the transmission weight calculator 115 by a signal transmitted from the antennas 1 and 2 of the wireless apparatus 100.

The beam-forming unit 211 performs a weighted combination of a signal received by the wireless apparatus 200. The beam-forming unit 211 forms electric waves (or beams), which are transmitted from the wireless apparatus 200 and have directivity toward a user terminal. The beam-forming unit 211 includes a transmission weight multiplier 212, a reception weight multiplier 213, a reception weight calculator 214, and a transmission weight calculator 215. The reception weight calculator 214 calculates reception weights for the wireless apparatus 200. The reception weight multiplier 213 multiplies a reception weight calculated by the reception weight calculator 214 by a signal received at each of the antennas 3 and 4 of the wireless apparatus 200. The transmission weight calculator 215 calculates transmission weights for the wireless apparatus 200. The transmission weight multiplier 212 multiplies a transmission weight calculated at the transmission weight calculator 215 by a signal transmitted from each of the antennas 3 and 4 of the wireless apparatus 200.

Figure 2:
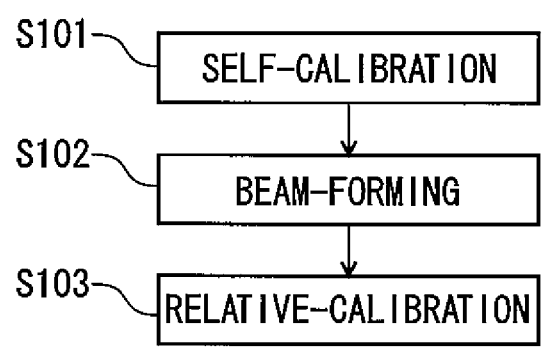
FIG. 2 illustrates an operation of the wireless system according to the first embodiment.

FIG. 2 illustrates a calibration method performed at the wireless system according to the first embodiment. Any processing can be employed as the calibration, as long as the processing makes the directivity at the transmission and the directivity at the reception substantially the same as each other. The calibration can be defined as uniformly setting of a ratio of the transfer function of the transmission system to the transfer function of the reception system among plural transmission and reception systems. In a first step (step S101), the wireless system performs calibration (self-calibration) of the transmission and reception systems of each of the wireless apparatuses 100 and 200. In a second step (step S102), the wireless system directs the directional beam at transmission and the directional beam at reception toward each other between the wireless apparatuses 100 and 200 (beam-forming). In a third step (step S103), the calibration (relative-calibration) of the transmission system and the reception system between the wireless apparatuses 100 and 200 is performed. Upon completion of the self-calibration (in the first step), if the reception level of a calibration signal which is a known signal and transmitted and received between the wireless apparatuses 100 and 200 is high, the relative-calibration (in the third step) can be performed without directing the directional beam at transmission and the directional beam at reception toward each other between the wireless apparatuses 100 and 200.

(First Step: Self-Calibration)

Figure 3:
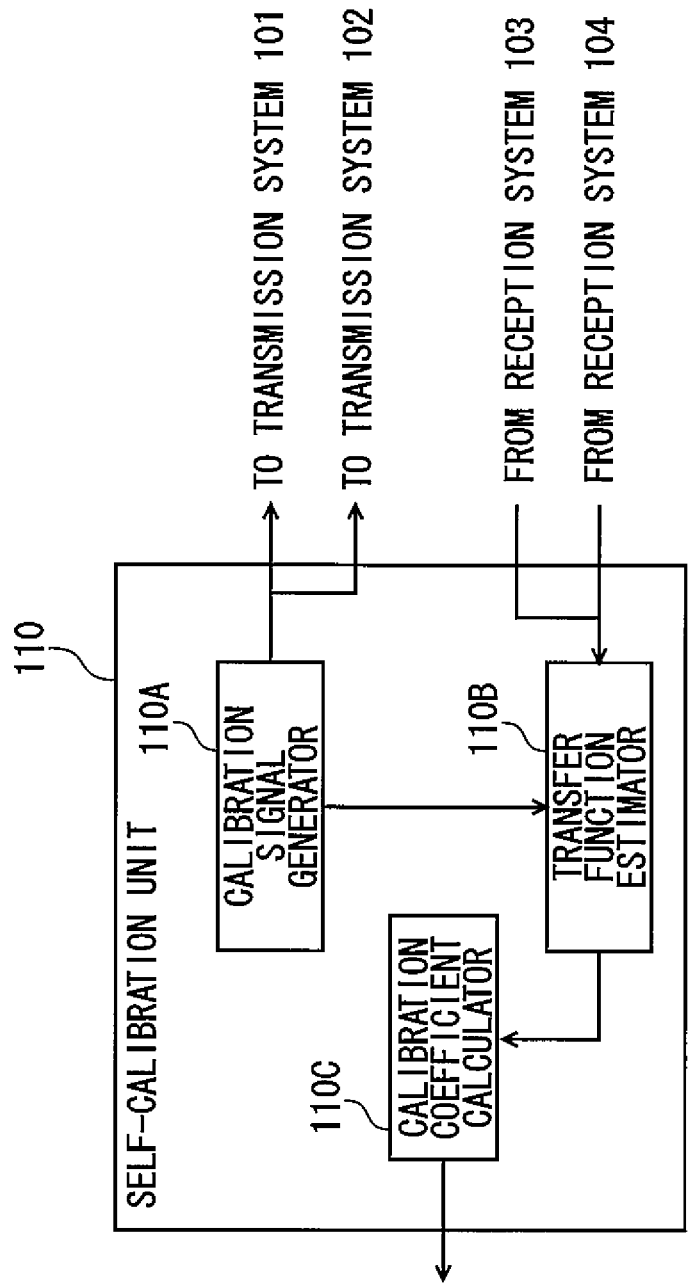
FIG. 3 illustrates a self-calibration unit according to the first embodiment.

FIG. 3 illustrates the self-calibration unit 110. The self-calibration unit 210 is similar to the self-calibration unit 110. The self-calibration unit 110 includes a calibration signal generator 110A, a transfer function estimator 110B, and a calibration coefficient calculator 110C.

First, the calibration signal generator 110A generates a calibration signal which is a known signal for self-calibration of the wireless apparatus 100. The calibration signal is input to one 101 of the two transmission systems 101 and 102 via the transmission weight multiplier 112. The transmission system 101 transmits a calibration signal via the antenna 1. The transmission weight multiplier 112 does not multiply a calibration signal by a weight when performing self-calibration. The transmission weight multiplier 112 can allow a calibration signal to pass therethrough. Alternatively, the transmission weight multiplier 112 can multiply a calibration signal by a weight [1, 1].

Next, the reception system 104 receives, via the antenna 2, the calibration signal transmitted from the antenna 1. A signal which is a calibration signal transmitted from the antenna 1 and also received by the reception system 103 can be discarded by either the reception weight multiplier 113 or the transfer function estimator 110B. The calibration signal received by the reception system 104 is input to the transfer function estimator 110B via the reception weight multiplier 113. The reception weight multiplier 113 does not multiply a calibration signal by a weight. The reception weight multiplier 113 can allow a calibration signal to pass therethrough. Alternatively, the reception weight multiplier 113 can multiply a calibration signal by a weight [1, 1].

Next, the transfer function estimator 110B divides the calibration signal sent thereto via the transmission system 101 or the reception system 104 by a calibration signal generated by the calibration signal generator 110A. Thus, a transfer function $r_{12}$ of a path from the transmission system 101 to the reception system 104 can be estimated (by Expression 1).

$$r_{12} = T_1 v_{12} R_2 \qquad \text{[Expression 1]}$$

$T_1$ designates a transfer function of the transmission system 101, $v_{12}$ denotes a transfer function of the space (i.e., a wireless interval) extending from the antenna 1 to the antenna 2, and $R_2$ represents a transfer function of the reception system 103.

Similarly, a calibration signal is transmitted from the transmission system 102 and received by the reception system 103. Thus, a transfer function $r_{21}$ of a path from the transmission system 102 to the reception system 103 can be estimated (by Expression 2).

$$r_{21} = T_2 v_{21} R_1 \qquad \text{[Expression 2]}$$

$T_2$ designates a transfer function of the transmission system 102, $v_{21}$ denotes a transfer function of the space (i.e., a wireless interval) extending from the antenna 2 to the antenna 1, and $R_1$ represents a transfer function of the reception system 104.

The calibration coefficient calculator 110C calculates a calibration coefficient $K_{100}$ (by Expression 3) using the transfer function $r_{12}$ (i.e., an estimated value) of the path from the transmission system 101 for the antenna 1 to the reception system 104 for the antenna 2, and the transfer function $r_{21}$ (i.e., an estimated value) of the path from the transmission system 102 for the antenna 2 to the reception system 103 for the antenna 2.

$$K_{100} = \frac{r_{12}}{r_{21}} = \frac{T_1 v_{12} R_2}{T_2 v_{21} R_1} = \frac{T_1 R_2}{T_2 R_1} \qquad \text{[Expression 3]}$$

$v_{12}$ designates the transfer function of a path from the antenna 1 to the antenna 2, and $v_{21}$ denotes the transfer function of a path from the antenna 2 to the antenna 1. Here, $v_{12}$ is regarded as being the same as $v_{21}$.

A ratio of the transfer function of the transmission system 101 for the antenna 1 to the transfer function of the reception system 103 for the antenna 1 is $T_1/R_1$ before the self-calibration is performed. A ratio of the transfer function of the transmission system 102 for the antenna 2 to the transfer function of the reception system 104 for the antenna 2 $T_2/R_2$ before the self-calibration is performed.

For example, The ratio of the transfer functions of the transmission and reception systems 102 and 104 for the antenna 2 is multiplied by the calibration coefficient $K_{100}$, when the antenna 2 transmits, to be equal to the ratio of the transfer functions of the transmission and reception systems 101 and 103 for the antenna 1 as a reference, in the following manner (Expression 4).

$$K_{100} \frac{T_2}{R_2} = \frac{T_1 R_2}{T_2 R_1} \frac{T_2}{R_2} = \frac{T_1}{R_1} = \alpha_{100} \qquad \text{[Expression 4]}$$

$\alpha_{100}$ is not only a ratio of the transfer functions of the transmission and reception systems 101 and 103 for the antenna 1, but also a ratio of the transfer functions of the transmission and reception system 102 and 104 for the antenna 2 after the self-calibration.

The calibration coefficient $K_{100}$ (i.e., a self-calibration result) is sent from the calibration coefficient calculator 110C to the transmission weight calculator 115. Thus, the self-calibration of the wireless apparatus 100 is completed. Upon completion of the self-calibration, the transmission weight calculator 115 generates a transmission weight by multiplying a reception weight by the calibration coefficient $K_{100}$ by which a wireless signal transmitted via the antenna 2 is multiplied.

Thus, the directivity at reception in the wireless apparatus 100 is made substantially the same as the directivity at transmission therein. In the wireless apparatus 100, if the reception weight for forming the directional beam at reception by the reception system is used as the transmission weight for the directional beam at transmission by the transmission system. All the above variables are complex numbers. Thus, each of the variables has an amplitude and a phase.

When self-calibration is performed, a time (i.e., synchronization timing) elapsed from the transmission of the calibration signal by the transmission system 101 to the reception of the calibration signal by the reception system 104 is set to be the same as a time elapsed from the transmission of the calibration signal by the transmission system 102 to the reception of the calibration signal by the reception system 103. Thus, a phase shift of the transfer function can be prevented.

The self-calibration unit 210 performs the self-calibration of the wireless apparatus 200, similarly to the above self-calibration unit 110. The wireless apparatus 200 includes two sets of transmission and reception systems for the antennas 3 and 4. The self-calibration unit 210 performs self-calibration. Thus, the ratio of the transfer function of the transmission system 201 for the antenna 3 to the transfer function of the reception system 203 for the antenna 3 is set to be equal to the ratio of the transfer function of the transmission system 202 for the antenna 4 to the transfer function of the reception system 204 for the antenna 4. The transmission weight multiplier 212 multiplies a wireless signal transmitted via the antenna 4 by a calibration coefficient $K_{200}$. $\alpha_{200}$ is not only a ratio of the transfer functions of the transmission and reception systems 201 and 203 for the antenna 3, but also a ratio of the transfer functions of the transmission and reception systems 202 and 204 for the antenna 4 after the self-calibration.

Upon completion of the self-calibration (i.e., upon completion of step S101 illustrated in FIG. 2), $\alpha_{100}$ can be different from $\alpha_{200}$. At relative-calibration (in step S103 illustrated in FIG. 2), $\alpha_{100}$ and $\alpha_{200}$ are set to be equal to each other.

(Second Step: Configuring of Directivity)

Figure 4:
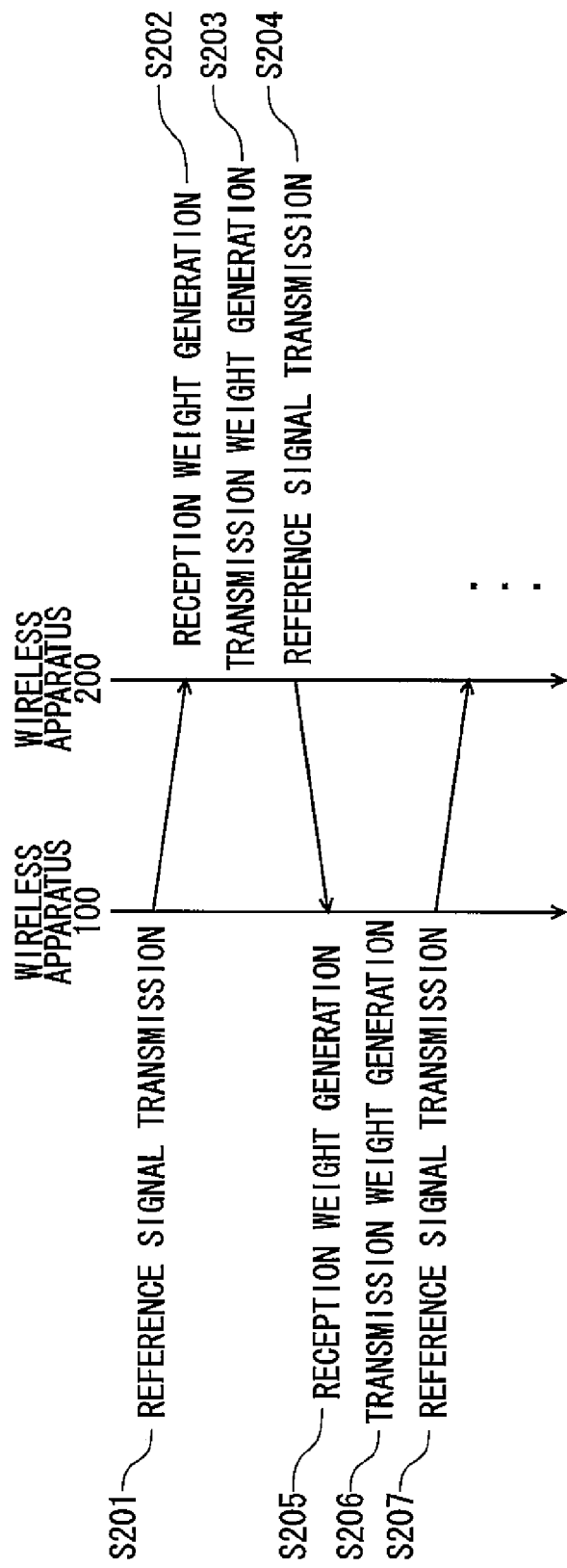
FIG. 4 illustrates a beam forming procedure according to the first embodiment.

FIG. 4 illustrates a (beam forming) procedure for directing the directional beams at transmission and the directional beams at reception toward each other between the wireless apparatuses 100 and 200. The transmission weight multipliers 112 and 212 and the reception weight multipliers 113 and 213 calculate transmission weights and reception weights using a reference signal (a known signal) which the wireless apparatus 100 and the wireless apparatus 200 take turns to transmit, in order to direct the directional beams at transmission and the directional beams at reception toward each other. Hereinafter the procedure is described.

First, the transmission weight multiplier 112 multiplies, by a transmission weight, the reference signal serving as a known signal for forming a beam. In step S201, the transmission system 101 and 102 of the wireless apparatus 100 transmit reference signals each of which multiplied by a transmission weight. The transmission weight by which the transmission weight multiplier 112 multiplies the reference signal is set at a predetermined initial value. The initial value is, e.g., [1, 0] for using only the transmission system 101.

Next, the reception systems 203 and 204 of the wireless apparatus 200 receive reference signals transmitted from the transmission system 101 of the wireless apparatus 100. The reference signals received by the reference systems 203 and 204 are input to the reception weight multiplier 213. In step S202, the reception weight calculator 214 generates reception weights using the reference signals received by the reception systems 203 and 204. Many methods for generating reception weights are known. Any of such methods can be used. Hereinafter, a method for generating reception weights according to a minimum mean square error (MMSE) criterion using reference signals transmitted from the wireless apparatus 100 is described by way of example.

A reference signal x received by each of the reception systems 203 and 204 is designated such that $x=[x_1, x_2]^T$. A reference signal is designated by $d_r^T$. $x_1$, $x_2$, and $d_r^T$ are column vectors. "$(\ )^T$" represents a transpose of a matrix or the like. It is assumed that $R_{xx}=E(xx^H)$, and that $q_{xr}=E(xd_r^H)$. The reception weight calculator 214 generates a reception weight according to the MMSE criterion as follows (Expression 5).

$$w_{rx} = (R_{xx}^{-1} q_{xr})^H \quad \text{[Expression 5]}$$

"E( )" represents an ensemble average. However, an average value obtained using a finite number of samples is used to calculate an ensemble average. "$(\ )^H$" represents a Hermitian transpose of a matrix or the like. The wireless apparatus 200 can direct the directional beam at reception toward the wireless apparatus 100 using the reception weight according to MMSE criterion (Expression 5).

Next, in step S203, the transmission weight multiplier 212 generates a transmission weight by which a reference signal to be transmitted to the wireless apparatus 100 from the wireless apparatus 200 is multiplied. The transmission weight multiplier 212 generates transmission weights $w_{tx}(1)$, $w_{tx}(2)$ by multiplying a self-calibration correction coefficient $K_{200}$ for the wireless apparatus 200 by the reference weight generated using the reference signal received by the wireless apparatus 200 (see Expression 6).

$$\begin{bmatrix} w_{tx}(1) \\ w_{tx}(2) \end{bmatrix} = \begin{bmatrix} w_{rx}(1) \\ K_{200} w_{rx}(2) \end{bmatrix} \quad \text{[Expression 6]}$$

In connection with the reference signal transmitted from the wireless apparatus 100 to the wireless apparatus 200, $w_{rx}(1)$ designates a reception weight corresponding to the reception system 203, and $w_{rx}(2)$ denotes a reception weight corresponding to the reception system 204. In connection with the reference signal transmitted from the wireless apparatus 200 to the wireless apparatus 100, $w_{rx}(1)$ designates a reception weight corresponding to the transmission system 201, and $w_{rx}(2)$ denotes a reception weight corresponding to the transmission system 202.

Next, the transmission weight multiplier 212 multiplies a reference signal transmitted from the wireless apparatus 200 to the wireless apparatus 100 by a transmission weight w generated by the transmission weight multiplier 212.

In step S204, the transmission systems 201 and 202 of the wireless apparatus 200 transmit, via the antennas 3 and 4, the reference signals multiplied by the transmission weight $w_{tx}$.

Thus, the wireless apparatus 200 generates the transmission weight $w_{tx}$, by correcting the reception weight $w_{rx}$ with the self-calibration result $K_{200}$. Consequently, the directional beam at transmission can be directed toward the wireless apparatus 100.

After that, in step S205 to S207, similarly, the transmission weight multiplier 112 generates a transmission weight by correcting the reception weight generated by the reception weight calculator 114, using the self-calibration result $K_{100}$. Thus, the directional beam at transmission can be directed toward the wireless apparatus 200. Then, the wireless apparatus 100 further transmits reference signals to the wireless apparatus 200. Such processing in steps S205 to S207 is performed similarly to the processing in steps S202 to S204. Therefore, the description of such processing is omitted. The more the processing in steps S201 to S206 is repeated, between the wireless apparatuses 100 and 200 the directional beam at transmission and the directional beam at reception can be directed toward each other with good accuracy.

Hereinafter, an example of performing processing once in steps S201 to S206 and next performing relative-calibration will be explained. It is assumed that upon completion of processing in step S206, the transmission weight of the wireless apparatus 100 is $w_{tx,\,100}$, the reception weight thereof is $w_{rx,\,100}$, the transmission weight of the wireless apparatus 200 is $w_{tx,\,200}$, and the reception weight thereof is $w_{rx,\,200}$.

Figure 5:
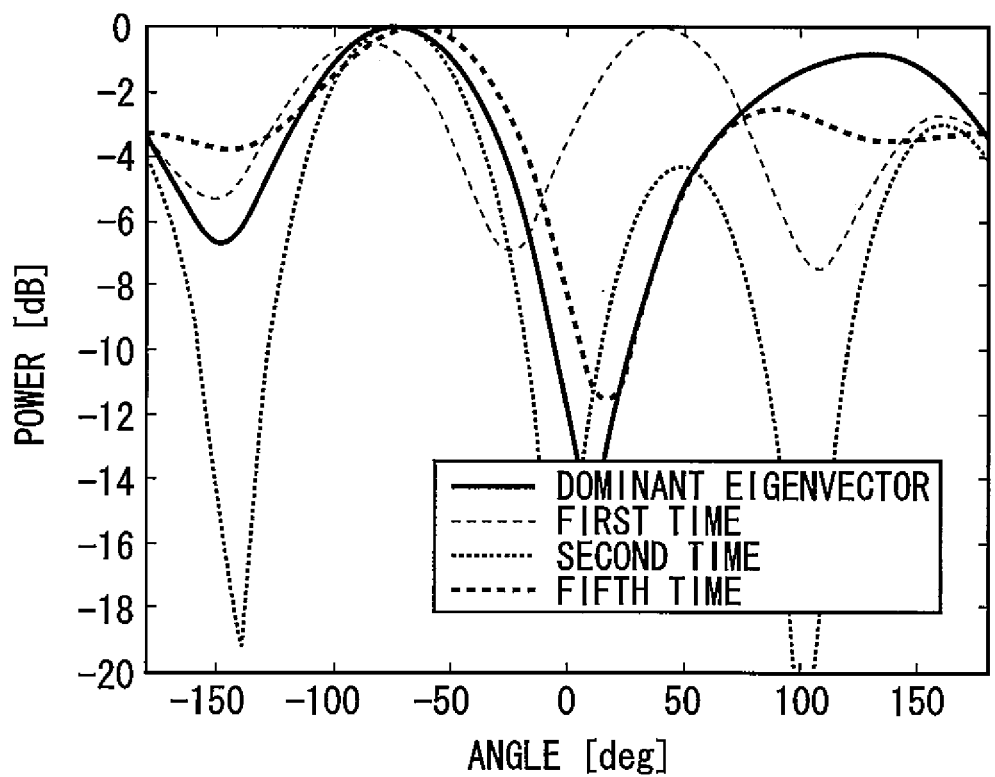
FIG. 5 illustrates directivity obtained by computer simulation.

FIG. 5 illustrates directivity at transmission by the wireless apparatus 100, which is obtained by computer simulation. A thick solid line represents directivity (ideal characteristic) at transmission by the wireless apparatus 100 in a case where information concerning a propagation channel between the wireless apparatus 100 and the wireless apparatus 200 is accurately acquired. At that time, each weight is a singular vector of a propagation channel matrix configured corresponding to a set of propagation channels among the antennas 1 to 4.

Thin dotted line represents directivity of the wireless apparatus 100, which is obtained when the processing in steps S201 to S206 is once completed. A medium-thickness dotted line represents directivity at transmission by the wireless apparatus 100 in a case where the processing in steps S201 to S206 is twice completed. A thick dotted line represents directivity at transmission by the wireless apparatus 100 in a case where the processing in steps S201 to S206 is completed five times. The more the processing in steps S201 to S206 is repeated, the more the directivity by the wireless apparatus 100 becomes closer to an ideal characteristic thereof. In the case of this example of computer simulation, substantially perfect directivity is obtained by repeating the processing twice or so. However, the processing can be repeated many times according to the environment of the wireless interval and the required accuracy of the calibration.

In the foregoing description, the example has been described, in which the directivity is configured while the reference signals are mutually transmitted between the wireless apparatuses 100 and 200. However, a method for configuring the directivity according to the transmission between the wireless apparatuses 100 and 200 is not limited thereto. For example, if the relative positions and angles of the wireless apparatuses 100 and 200 can be acquired by GPS or the like, the directivity can be configured, based on position information and angle information.

(Third Step: Relative-Calibration)

An outline of a procedure for performing relative-calibration is as follows. First, the wireless apparatus 100 transmits a calibration signal using a transmission weight $w_{tx,\,100}$. The wireless apparatus 200 receives the calibration signal using a reception weight $w_{rx,\,200}$. The wireless signal processor 300 calculates (or estimates) a transfer function of a path from the wireless apparatus 100 to the wireless apparatus 200 using the calibration signal transmitted from the wireless apparatus 100 to the wireless apparatus 200. Methods for generating a calibration signal, for transmitting a calibration signal and for calculating a transfer function in the relative-calibration are similar to those in the self-calibration. Thus, the description thereof is omitted.

Next, the wireless apparatus 200 transmits a calibration signal using a transmission weight $w_{tx,\,200}$. The wireless apparatus 100 receives the calibration signal using the reception weight $w_{rx,\,100}$. The wireless signal processor 300 calculates (or estimates) a transfer function of a path from the wireless apparatus 200 to the wireless apparatus 100 using the calibration signal transmitted from the wireless apparatus 200 to the wireless apparatus 100.

Then, the relative-calibration unit 301 calculates a relative-calibration coefficient using the transfer function of a path from the wireless apparatus 100 to the wireless apparatus 200 and the transfer function of a path from the wireless apparatus 200 to the wireless apparatus 100.

Hereinafter, the principle of processing by the relative-calibration unit 301 is described. A transfer function of a space in each of the wireless apparatuses 100 and 200 other than the spaces (wireless intervals) is considered. First, an internal transfer function in the case of transmitting a calibration signal by the wireless apparatus 100 using the transmission weight $w_{tx,\,100}$ is given by Expression 7.

$$\begin{bmatrix} T_1 w_{tx,100}(1) \\ T_2 w_{tx,100}(2) \end{bmatrix} \quad \text{[Expression 7]}$$

Similarly, an internal transfer function in the case of transmitting a calibration signal by the wireless apparatus 100 using the reception weight $w_{rx,\,100}$ is given by Expression 8.

$$\begin{bmatrix} R_1 w_{rx,100}(1) \\ R_2 w_{rx,100}(2) \end{bmatrix} \quad \text{[Expression 8]}$$

Components $w_{tx,\,100}(1)$ and $w_{tx,\,100}(2)$ are a first element and a second element of $w_{tx,\,100}$, respectively. Components $w_{rx,\,100}(1)$ and $w_{rx,\,100}(2)$ are a first element and a second element of $w_{rx,\,100}$, respectively.

From Expression 6, the following relation is obtained in the wireless apparatus 100.

$$\begin{bmatrix} w_{tx,100}(1) \\ w_{tx,100}(2) \end{bmatrix} = \begin{bmatrix} w_{rx,100}(1) \\ K_{100} w_{rx,100}(2) \end{bmatrix} \quad \text{[Expression 9]}$$

Thus, Expression 7 can be also expressed as follows.

$$\begin{bmatrix} T_1 w_{tx,100}(1) \\ T_2 w_{tx,100}(2) \end{bmatrix} = \begin{bmatrix} T_1 w_{rx,100}(1) \\ T_2 K_{100} w_{rx,100}(2) \end{bmatrix} \quad \text{[Expression 10]}$$
$$= \alpha_{100} \begin{bmatrix} R_1 w_{rx,100}(1) \\ R_2 w_{rx,100}(2) \end{bmatrix}$$

Expression 4 is used in expansion on a second line of Expression 10.

Weights in Expression 10, which include transfer functions of wireless intervals in the transmission systems of the wireless apparatus 100, are newly defined as follows.

$$\bar{w}_{tx,100} = \begin{bmatrix} T_1 w_{tx,100}(1) \\ T_2 w_{tx,100}(2) \end{bmatrix} \quad \text{[Expression 11]}$$

Weights including transfer functions of wireless intervals in the reception systems of the wireless apparatus 100 are newly defined as follows.

$$\bar{w}_{rx,100} = \begin{bmatrix} R_1 w_{rx,100}(1) \\ R_2 w_{rx,100}(2) \end{bmatrix} \quad \text{[Expression 12]}$$

Thus, the following relation is obtained.

$$\bar{w}_{tx,100} = \alpha_{100} \bar{w}_{rx,100} \quad \text{[Expression 13]}$$

Similarly, weights including transfer functions of wireless intervals in the transmission and the reception systems of the wireless apparatus 200 are newly defined. Thus, the following relation is obtained.

$$\bar{w}_{tx,200} = \alpha_{200} \bar{w}_{rx,200} \quad \text{[Expression 14]}$$

Figure 6:
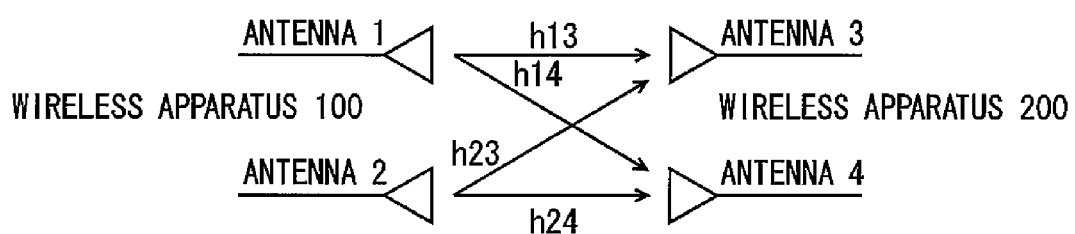
FIG. 6 illustrates transfer coefficients of propagation channels of the wireless system according to the first embodiment.

FIG. 6 illustrates a transfer function of a space (a wireless interval) from the wireless apparatus 100 to the wireless apparatus 200. A transfer coefficient of a wireless interval from the antenna 1 of the wireless apparatus 100 to the antenna 3 of the wireless apparatus 200 is $h_{13}$. A transfer coefficient of a wireless interval from the antenna 1 of the wireless apparatus 100 to the antenna 4 of the wireless apparatus 200 is $h_{14}$. A transfer coefficient of a wireless interval from the antenna 2 of the wireless apparatus 100 to the antenna 3 of the wireless apparatus 200 is $h_{23}$. A transfer coefficient of a wireless interval from the antenna 2 of the wireless apparatus 100 to the antenna 4 of the wireless apparatus 200 is $h_{22}$. A transfer matrix corresponding to the wireless interval from the wireless apparatus 100 to the wireless apparatus 200 is given by Expression 15.

$$H_{100,200} = \begin{bmatrix} h_{13} & h_{14} \\ h_{23} & h_{24} \end{bmatrix} \quad \text{[Expression 15]}$$

Figure 7:
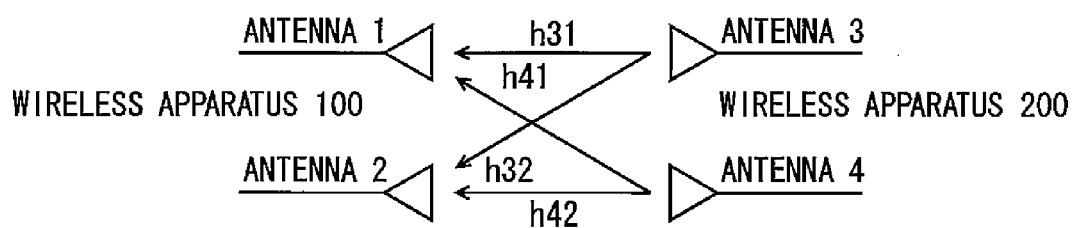
FIG. 7 illustrates transfer coefficients of propagation channels of the wireless system according to the first embodiment.

FIG. 7 illustrates a transfer function of a space (a wireless interval) from the wireless apparatus 200 to the wireless apparatus 100. A transfer coefficient of a wireless interval from the antenna 3 of the wireless apparatus 200 to the antenna 1 of the wireless apparatus 100 is $h_{31}$. A transfer coefficient of a wireless interval from the antenna 3 of the wireless apparatus 200 to the antenna 2 of the wireless apparatus 100 is $h_{32}$. A transfer coefficient of a wireless interval from the antenna 4 of the wireless apparatus 200 to the antenna 1 of the wireless apparatus 100 is $h_{41}$. A transfer coefficient of a wireless interval from the antenna 4 of the wireless apparatus 200 to the antenna 2 of the wireless apparatus 100 is $h_{42}$. A transfer matrix corresponding to the wireless interval from the wireless apparatus 200 to the wireless apparatus 100 is given by Expression 16.

$$H_{200,100} = \begin{bmatrix} h_{31} & h_{41} \\ h_{32} & h_{42} \end{bmatrix} \quad \text{[Expression 16]}$$

Each of the matrices respectively expressed by Expressions 15 and 16 is a transfer matrix of a propagation channel configured only by a wireless interval. Thus, there is the following relation. $H_{100,\,200} = H^T_{200,\,100}$. From the above expressions, a transfer function $r_{100,\,200}$ of the space from the wireless apparatus 100 to the wireless apparatus 200 is given by Expression 17.

$$r_{100,200} = \bar{w}_{rx,200}^T H_{100,200} \bar{w}_{tx,100} \quad \text{[Expression 17]}$$

For simplicity of description, Expression 17 is described using the transfer functions that are obtained using calibration signals. The expression "( )$^T$" represents a transpose. For simplicity of description, no noise components are described in Expression 17.

In a case where the propagation environment between the wireless apparatuses 100 and 200 is poor, if the relative-calibration (i.e., a third step) is performed without performing the beam-forming (i.e., a second step), directional beams mutually directed towards the wireless apparatuses are not configured. Such a case may correspond to an event in which transmission is performed only by the antenna 1, while reception is performed only by the antenna 3, so that the transfer function $r_{100, 200}$ according to Expression 17 can substantially be equivalent to $h_{13}$ ($r_{100, 200}$ is nearly equal to $h_{13}$), and that the relative-calibration cannot correctly be implemented due to noise.

If the relative-calibration (i.e., a third step) is performed after the beam-forming (i.e., a second step) is performed, as illustrated in FIG. 5, the weights including the internal transfer functions of the transmission system of the wireless apparatus 100 become close to vectors (right singular vectors), which match the propagation channels, and to the weights (left singular vectors) including the internal transfer functions of the transmission system of the wireless apparatus 200. Thus, the reception level according to the transfer function determined by Expression 17 is increased. Accordingly, the apparatus excels in noise tolerance.

Similarly, the transfer function $r_{200, 100}$ of the wireless interval from the wireless apparatus 200 to the wireless apparatus 100 is expressed by Expression 18.

$$r_{200,100} = \overline{w}_{rx,100}^T H_{200,100} \overline{w}_{tx,200} \quad \text{[Expression 18]}$$

The transpose of the transfer function expressed by Expression 18 is given by Expression 19.

$$\begin{aligned} r_{200,100}^T &= r_{200,100} \quad \text{[Expression 19]} \\ &= \overline{w}_{tx,200}^T H_{200,100}^T \overline{w}_{rx,100} \\ &= \alpha_{200} \overline{w}_{rx,200}^T H_{200,100}^T \frac{\overline{w}_{tx,100}}{\alpha_{100}} \\ &= \frac{\alpha_{200}}{\alpha_{100}} \overline{w}_{rx,200}^T H_{200,100}^T \overline{w}_{tx,100} \\ &= \frac{\alpha_{200}}{\alpha_{100}} \overline{w}_{rx,200}^T H_{100,200}^T \overline{w}_{tx,100} \\ &= \frac{\alpha_{200}}{\alpha_{100}} r_{100,200} = C r_{100,200} \end{aligned}$$

The relation $H_{100, 200} = H^T_{200, 100}$ indicating that the propagation channel of a wireless interval at transmission is the same as the propagation channel of the wireless interval at reception is used in deformation from a fourth line to a fifth line of Expression 19. As is understood from Expression 19, a ratio C between $\alpha_{100}$ and $\alpha_{200}$ can be calculated using results of estimating the transfer functions $r_{100, 200}$ and $r_{200, 100}$. The relative-calibration unit 301 obtains a relative-calibration coefficient C using the results of estimating the transfer functions $r_{100, 200}$ and $r_{200, 100}$. Then, the relative-calibration coefficient (relative-calibration result) C is sent from the relative-calibration unit 301 to the transmission weight calculator 115. Thus, the calibration of the wireless apparatuses 100 and 200 is completed.

As described above, both the transfer functions $r_{100, 200}$ and $r_{200, 100}$ are necessary for the calculation of Expression 17. The wireless apparatus 100 and the wireless apparatus 200 are connected to each other via the wireless signal processor 300 by a communication network. Thus, the calculation of the relative-calibration coefficient can be one of the wireless apparatuses, instead of the relative-calibration unit 301.

If one of the wireless apparatus 100 and the wireless apparatus 200 is not connected with the wireless signal processor 300 by the communication network, the wireless apparatus which is not connected to the wireless signal processor 300 by the connection network can feed back (or notifies) the transfer function, i.e., a result of estimation of the transfer function to the wireless apparatus connected to the wireless signal processor 300 by the communication network. A feedback method can be either a method for feeding back data obtained by quantizing the transfer function or a method for feeding back a transfer function coefficient as a transmission signal without change.

As described above, the relative-calibration coefficient C can be calculated by performing the relative-calibration (i.e., a third step) after the self-calibration (i.e., a first step).

First, reception weights for receiving reception signals at the antennas 1 to 4 of the wireless apparatuses 100 and 200 are generated. The transmission weight calculator 115 generates a transmission weight for the wireless apparatus 100 by multiplying the reception weight by a self-calibration coefficient and a relative-calibration coefficient. The transmission weight calculator 215 generates a transmission weight for the wireless apparatus 200 by multiplying the reception weight only by the self-calibration coefficient. Thus, transmission signals are transmitted by the antennas 1 to 4 of the wireless apparatuses 100 and 200 using the transmission weights generated by the transmission weight calculators 115 and 215. Accordingly, the directivity at reception and the directivity at transmission of the wireless apparatuses 100 and 200 (i.e., the antennas 1 to 4), which are treated as one apparatus, can be made to match to each other.

The calibration of the plural physically-separated wireless apparatuses 100 and 200 is implemented by performing first the self-calibration and next the relative-calibration in two stages. The directional beam at transmission of waves generated in cooperation with the plural physically-separated wireless apparatuses 100 and 200 can be directed toward a user terminal with good accuracy. Thus, the reception performance of the user terminal can be improved. The interference of a wireless apparatus to another wireless apparatus at transmission can largely be reduced due to the improvement of calibration accuracy. Accordingly, the capacity of the entire wireless system can be increased.

The accuracy of the relative-calibration can be enhanced by performing the beam-forming (i.e., the second step) after the self-calibration (i.e., the first step), and before the relative-calibration (i.e., the third step). In this case, the directivity at reception and the directivity at transmission of the wireless apparatuses 100 and 200 (i.e., the antennas 1 to 4), which are treated as one apparatus, can be made substantially the same as each other more accurately. In a cellular system, wireless apparatuses are installed to be separated from one another to avoid interference thereamong and to suppress facility cost. Thus, the reception levels of calibration signals mutually received by the wireless apparatuses may become low, so that the calibration signals are buried in noise. Also, the accuracy of estimating transfer functions used for calculating a relative-calibration coefficient may become low, so that calibration accuracy is degraded. However, the relative-calibration of the plural physically-separated wireless apparatuses 100 and 200 can be calculated with good precision by performing the relative-calibration after directivity matched to the propagation channel is configured. Thus, calibration accuracy can be improved.

When the relative-calibration is performed, a time elapsed from the transmission of the calibration signal by the wireless apparatus 100 to the reception of the calibration signal (strictly speaking, the estimation of the transfer function according to Expression 17) by the wireless apparatus 200 is set to be the same as a time elapsed from the transmission of the calibration signal by the wireless apparatus 200 to the reception of the calibration signal (strictly speaking, the estimation of the transfer function according to Expression 17) by the wireless apparatus 100 (i.e., synchronization of such timing is performed). Thus, a phase shift of the transfer function can be prevented.

(Allocation of Wireless Slots)

The wireless system can be a base station in a cellular system or the like. A transmission slot is a time in which a base station transmits a wireless signal to each user terminal (e.g., a cellular phone). A reception slot is a time in which each user terminal transmits a wireless signal to a base station.

The transmission and reception of a calibration signal in the self-calibration can be performed in either a transmission slot or a reception slot in which the transmission of a signal by each user terminal is suppressed. Thus, a reception signal from a user terminal can be prevented from being mixed into a result of the reception of the calibration signal.

A time elapsed from a moment at which a calibration signal for measuring a transfer function of a path from the transmission system 101 to the reception system 104 according to Expression 1 is transmitted, to a moment at which a calibration signal for measuring a transfer function of a path from the transmission system 102 to the reception system 103 according to Expression 2 is transmitted is set to be as short as possible.

Figure 8:
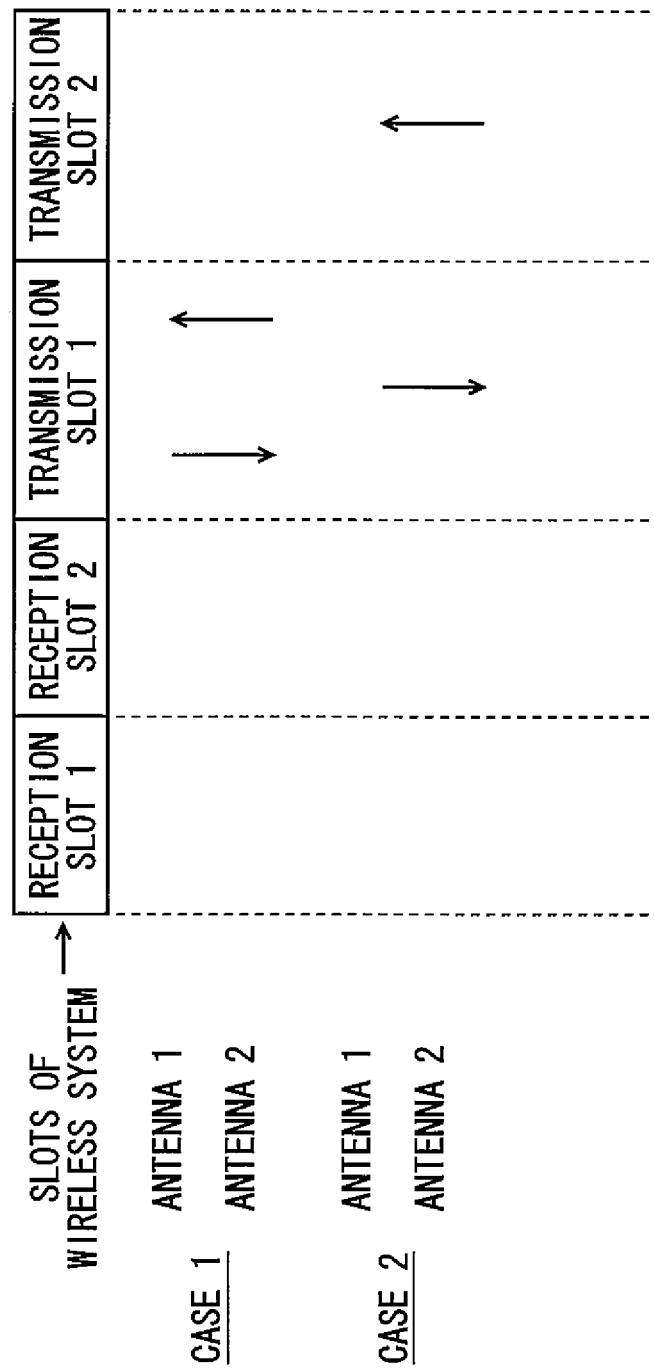
FIG. 8 illustrates slots of the wireless system according to the first embodiment.

FIG. 8 illustrates the relation between the self-calibration (i.e., the first step) in the wireless system according to the first embodiment and each of four wireless slots in one frame. As described in CASE 1 in FIG. 8, the transmission of a calibration signal from the antenna 1 to the antenna 2, and the transmission of a calibration signal from the antenna 2 to the antenna 1 can be performed in one transmission slot (i.e., TRANSMISSION SLOT 1). As described in CASE 2 in FIG. 8, the transmission of a calibration signal from the antenna 1 to the antenna 2, and the transmission of a calibration signal from the antenna 2 to the antenna 1 can be performed in adjacent transmission slots (i.e., TRANSMISSION SLOTs 1 and 2), respectively. Thus, a presumption that the transfer function of a path according to Expression 1 is substantially the same as the transfer function of a wireless interval according to Expression 2 can be justified, and the accuracy of the self-calibration can be enhanced.

FIG. 9 illustrates the relation among the beam-forming at a wireless system according to the first embodiment, the relative-calibration (i.e., the second and the third steps), and four wireless slots in one frame. The transmission of reference signals to be alternately transmitted for beam-forming can be performed in one transmission slot (i.e., TRANSMISSION SLOT 1) described in CASE 1 in FIG. 9. Alternatively, the transmission of reference signals to be alternately transmitted for beam-forming can be performed in two adjacent transmission slots (i.e., TRANSMISSION SLOTS 1 and 2) described in CASE 2 in FIG. 9, respectively. Alternatively, the transmission of reference signals to be alternately transmitted for beam-forming can be performed in transmission slots of different frames (not shown).

If the intervals of transmission of reference signals for beam-forming are long, as compared with those of transmission in the self-calibration and in the relative-calibration, performance degradation is difficult to occur. This is because it is unnecessary to cancel out the influence of the propagation channel. Even if the transmission weight at the transmission of the reference signal from the wireless apparatus 100 to the wireless apparatus 200 is shifted, the shift can be absorbed to some extent at the generation of a reception weight by the wireless apparatus 200.

In the relative-calibration, as described in CASE 1 in FIG. 9, the transmission of a calibration signal from the wireless apparatus 100 to the wireless apparatus 200, and the transmission of a calibration signal from the wireless apparatus 200 to the wireless apparatus 100 can be performed in one transmission slot (i.e., TRANSMISSION SLOT 1). In the relative-calibration, as described in CASE 2 in FIG. 9, the transmission of a calibration signal from the wireless apparatus 100 to the wireless apparatus 200, and the transmission of a calibration signal from the wireless apparatus 200 to the wireless apparatus 100 can be performed in adjacent transmission slots (i.e., TRANSMISSION SLOTs 1 and 2), respectively. Thus, a presumption that the transfer function of a path is equal to the transfer function of a wireless interval can be justified, and the accuracy of the relative-calibration can be enhanced.

Other Embodiments

The invention is not limited to the above embodiment, and the embodiment can be expanded or modified. The expanded and modified embodiments are also included in the scope of the invention.

The invention claimed is:

1. A wireless signal processor which cooperates with a first wireless apparatus having a first antenna and a second antenna, and a second wireless apparatus having a third antenna and a fourth antenna, the wireless signal processor comprising:

a first calculator which calculates a first calibration coefficient for making a first ratio of transfer functions of first reception and transmission systems for the first antenna and a second ratio of transfer functions of second reception and transmission systems for the second antenna the same as each other;

a second calculator which calculates a second calibration coefficient for making a third ratio of transfer functions of third reception and transmission systems for the third antenna and a fourth ratio of transfer functions of fourth reception and transmission systems for the fourth antenna the same as each other;

a first estimator which estimates a first transfer function of a path from the first wireless apparatus to the second wireless apparatus using a signal obtained by receiving, at a first reception weight by the second wireless apparatus, a first calibration signal transmitted from the first wireless apparatus using a first transmission weight determined using the first calibration coefficient;

a second estimator which estimates a second transfer function of a path from the second wireless apparatus to the first wireless apparatus using a signal obtained by receiving, at a second reception weight by the first wireless apparatus, a second calibration signal transmitted from the second wireless apparatus using a second transmission weight determined using the second calibration coefficient; and a third calculator which calculates a third calibration coefficient for using the first transfer function and the second transfer function to make the first to fourth ratios the same as one another.

2. The wireless signal processor of claim 1,
wherein, when a first reference signal is transmitted from the first wireless apparatus to the second wireless apparatus (n+1)-times (n is an integer equal to or more than 1), and a second reference signal is transmitted from the second wireless apparatus to the first wireless apparatus n-times,
- a reception weight for an nth reception of the first reference signal is generated by the second wireless apparatus at the nth reception of the first reference signal,
- a transmission weight for an nth transmission of the second reference signal is generated by the second wireless apparatus using a product of the reception weight generated at the nth reception of the first reference signal, and the second calibration coefficient,
- a reception weight for an nth reception of the second reference signal is generated by the first wireless apparatus at the nth reception of the second reference signal, and
- the first transmission weight for an (n+1)-th transmission of the first reference signal is generated by the first wireless apparatus using a product of the first reception weight generated at the nth reception of the second reference signal, and the first calibration coefficient.

3. The wireless signal processor of claim 1,
wherein the first calculator calculates the first calibration coefficient using a third transfer function estimated using a third calibration signal transmitted from the first transmission system to the second reception system and a fourth transfer function estimated using a fourth calibration signal transmitted from the second transmission system to the first reception system, and
wherein the second calculator calculates the second calibration coefficient using a fifth transfer function estimated using a fifth calibration signal transmitted from the third transmission system to the fourth reception system and a sixth transfer function estimated using a sixth calibration signal transmitted from the fourth transmission system to the third reception system.

4. The wireless signal processor of claim 1,
wherein the wireless signal processor, the first wireless apparatus and the second wireless apparatus form a system, and
wherein, between a transmission slot for transmitting a wireless signal by the system and a reception slot for receiving a wireless signal by the system, the first calibration signal and the second calibration signal is transmitted and received in the transmission slot between the first wireless apparatus and the second wireless apparatus.

5. A wireless apparatus having a first antenna and a second antenna for performing transmission and reception with another wireless apparatus having a third antenna and a fourth antenna, the wireless apparatus comprising:
- a wireless transmitter which transmits, to the another wireless apparatus, a first calibration signal multiplied by a first transmission weight which is determined using a first calibration coefficient for making a first ratio of transfer functions of first reception and transmission systems for the first antenna and a second ratio of transfer functions of second reception and transmission systems for the second antenna the same as each other;
- a wireless receiver which receives, from the another wireless apparatus, a second calibration signal multiplied by a second transmission weight which is determined using a second calibration coefficient for making a third ratio of transfer functions of third reception and transmission systems for the third antenna and a fourth ratio of transfer functions of fourth reception and transmission systems for the fourth antenna the same as each other; and
- a receiver which receives a signal multiplied by a third calibration coefficient calculated using a first transfer function of a path from the wireless apparatus to the another wireless apparatus, which is estimated using a signal obtained by receiving the first calibration signal at a first reception weight, and a second transfer function of a path from the another wireless apparatus to the wireless apparatus, which is estimated using a signal obtained by receiving the second calibration signal at a second reception weight, the third calibration coefficient being used for making the first to fourth ratios the same as one another,
wherein the wireless transmitter transmits a signal received by the receiver.

6. The wireless apparatus of claim 5, wherein the wireless transmitter includes a digital-to-analog converter and an up converter.

7. The wireless apparatus of claim 6, wherein the wireless transmitter further includes a noise removal filter.

8. The wireless apparatus of claim 5, wherein the wireless receiver includes an analog-to-digital converter and a down converter.

9. The wireless apparatus of claim 8, wherein the wireless receiver further includes a noise removal filter.

* * * * *